United States Patent
Oyama

(10) Patent No.: US 11,465,646 B2
(45) Date of Patent: Oct. 11, 2022

(54) VEHICLE TRAVELING CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 31 days.

(21) Appl. No.: 16/890,690

(22) Filed: Jun. 2, 2020

(65) Prior Publication Data

US 2021/0031804 A1 Feb. 4, 2021

(30) Foreign Application Priority Data

Aug. 1, 2019 (JP) .............................. JP2019-142269

(51) Int. Cl.
*B60W 60/00* (2020.01)
*B60W 40/06* (2012.01)
(Continued)

(52) U.S. Cl.
CPC ........ *B60W 60/0025* (2020.02); *B60W 40/06* (2013.01); *B60W 60/0053* (2020.02);
(Continued)

(58) Field of Classification Search
CPC ......... B60W 60/0025; B60W 60/0053; B60W 40/06; B60W 2555/20; B60W 2552/05; B60W 2556/60; B60W 60/0011; B60W 30/18; B60W 2552/00; B60W 2552/53; B60W 2552/10; G01C 21/3691; G01C 21/3407; G01C 21/3602
See application file for complete search history.

(56) References Cited

U.S. PATENT DOCUMENTS 9,141,582 B1 * 9/2015 Brinkmann .......... G07C 5/0808
10,920,386 B2 * 2/2021 Gao ........................ G01S 15/93
(Continued)

FOREIGN PATENT DOCUMENTS

JP 2016-181015 A 10/2016
JP 2018-041194 A 3/2018

*Primary Examiner* — Frederick M Brushaber
(74) *Attorney, Agent, or Firm* — McDermott Will & Emery LLP

(57) ABSTRACT

A vehicle traveling control apparatus is configured to: acquire peripheral environment information around a vehicle; store road map information; estimate a vehicle position; acquire information of a road surface on which the vehicle travels; set a target travel path of the vehicle during automatic driving, referring to the road map information, based on the estimated vehicle position and input destination information; estimate lateral position information of a peripheral vehicle when the road surface is snow-covered and lane markers cannot be recognized; determine whether the peripheral vehicle deviates relative to the traveling lane based on the estimated lateral position information; and, when the peripheral vehicle deviates, set a deviation amount to deviate the vehicle toward a lane marker on a road shoulder side, correct a lateral position of the set target travel path set with the deviation amount, and set a new target travel path.

9 Claims, 13 Drawing Sheets

(51) Int. Cl.
*G01C 21/34* (2006.01)
*G01C 21/36* (2006.01)

(52) U.S. Cl.
CPC ..... *G01C 21/3407* (2013.01); *G01C 21/3691* (2013.01); *B60W 2552/05* (2020.02); *B60W 2552/10* (2020.02); *B60W 2552/53* (2020.02); *B60W 2555/20* (2020.02)

(56) References Cited

U.S. PATENT DOCUMENTS

| | | | |
|---|---|---|---|
| 2010/0238283 A1* | 9/2010 | Kim | B60W 50/16 348/135 |
| 2014/0018995 A1* | 1/2014 | Ferguson | G06V 20/58 701/1 |
| 2017/0080940 A1* | 3/2017 | Ito | B60W 30/16 |
| 2018/0065633 A1 | 3/2018 | Tamura | |
| 2018/0128635 A1 | 5/2018 | Nakamura et al. | |
| 2018/0141588 A1* | 5/2018 | Shimizu | B62D 15/0265 |
| 2020/0049513 A1* | 2/2020 | Ma | G06V 20/584 |
| 2020/0086866 A1* | 3/2020 | Miura | G05D 1/0088 |

* cited by examiner

VEHICLE TRAVELING CONTROL APPARATUS

CROSS-REFERENCE TO RELATED APPLICATIONS

The present application claims priority from Japanese Patent Application No. 2019-142269 filed on Aug. 1, 2019, the entire contents of which are hereby incorporated by reference.

BACKGROUND

The technology relates to a vehicle traveling control apparatus that enables automatic driving to be continued even in a situation in which lane markers marking the left and the right of a lane in which an own vehicle travels is covered with snow and the lane markers cannot be recognized.

A driving assist unit mounted on a vehicle map-matches an own vehicle position on a high-precision road map (dynamic map) based on position information received from a positioning satellite such as Global Navigation Satellite System (GNSS) satellite represented by a GPS satellite. Then, when an occupant (mainly a driver) sets a destination on the high-precision road map, the driving assist unit constructs a traveling route connecting the own vehicle position and the destination.

After that, the driving assist unit sets a target travel path for causing an own vehicle to travel along the traveling route, for several kilometers ahead of the own vehicle. In the high-precision road map, road information necessary for automatic driving is stored. The road information includes lane number information (two lanes, three lanes, etc.), road width information, curve curvature information, and the like. The driving assist unit sets a target travel path for causing the own vehicle to travel on the center of a selected traveling lane, based on the road information in the high-precision road map.

Therefore, as disclosed in Japanese Unexamined Patent Application Publication (JP-A) No. 2016-181015, for example, it is possible to guide an own vehicle along a target travel path constructed based on high-precision road map information and own vehicle position information estimated based on position information received from a positioning satellite. As a result, driving assist control can be continued even in a traveling on a snowy road on which the lane in which the own vehicle is traveling is covered with snow and lane markers marking the left and the right of the lane cannot be directly recognized with a sensing device such as a camera.

SUMMARY

An aspect of the technology provides a vehicle traveling control apparatus. The apparatus includes a peripheral environment information acquirer, a map information storage unit, an own vehicle position estimator, a road surface information acquirer, a target travel path setting unit, a peripheral vehicle lateral position information estimator, a deviation determiner, a target travel path correction unit, a peripheral vehicle lateral position information estimator, a deviation determiner, a target travel path correction unit. The peripheral environment information acquirer is configured to be mounted on an own vehicle and to acquire peripheral environment information around the own vehicle. The map information storage unit is configured to store road map information. The own vehicle position estimator is configured to estimate an own vehicle position of the own vehicle. The road surface information acquirer is configured to acquire information of a road surface on which the own vehicle travels. The a target travel path setting unit is configured to set a target travel path of the own vehicle at a time of automatic driving, with reference to the road map information stored in the map information storage unit, on a basis of information of the own vehicle position estimated by the own vehicle position estimator and input destination information. The peripheral vehicle lateral position information estimator is configured to estimate lateral position information of a peripheral vehicle traveling on a road on which the own vehicle travels, when the information of the road surface acquired by the road surface information acquirer is information of a snow-covered road surface and lane markers marking a left and a right of a lane in which the own vehicle travels cannot be visually recognized. The lateral position information is information of a lateral position of the peripheral vehicle relative to a traveling lane on the road map information stored in the map information storage unit. The deviation determiner is configured to determine whether the peripheral vehicle deviates relative to the traveling lane on a basis of the lateral position information of the peripheral vehicle estimated by the peripheral vehicle lateral position information estimator. The target travel path correction unit is configured to, when the deviation determiner determines that the peripheral vehicle deviates, set a deviation amount by which the own vehicle is caused to deviate toward a lane marker on a road shoulder side of the lane in which the own vehicle travels on the road map information stored in the map information storage unit, correct a lateral position of the target travel path set by the target travel path setting unit with the deviation amount, and set a new target travel path.

Another aspect of the technology provides a vehicle traveling control apparatus. The apparatus includes a map information storage unit and circuitry. The map information storage unit is configured to store road map information. The circuitry is configured to acquire peripheral environment information around an own vehicle. The circuitry is configured to estimate an own vehicle position of the own vehicle. The circuitry is configured to acquire information of a road surface to which the own vehicle advances. The circuitry is configured to set a target travel path of the own vehicle at a time of automatic driving, with reference to the road map information stored in the map information storage unit, on a basis of the estimated information of the own vehicle position and input destination information. The circuitry is configured to estimate lateral position information of a peripheral vehicle traveling on a road on which the own vehicle travels, when the information of the road surface is information of a snow-covered road surface and lane markers marking a left and a right of a lane in which the own vehicle travels cannot be visually recognized. The lateral position information is information of a lateral position of the peripheral vehicle relative to a traveling lane on the road map information stored in the map information storage unit. The circuitry is configured to determine whether the peripheral vehicle deviates relative to the traveling lane on a basis of the estimated lateral position information of the peripheral vehicle. The circuitry is configured to set, when it is determined that the peripheral vehicle deviates, a deviation amount by which the own vehicle is caused to deviate toward a lane marker on a road shoulder side of the lane in which the own vehicle travels on the road map information stored in the map information storage unit, correct a lateral position of the set target travel path with the deviation amount, and set a new target travel path.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
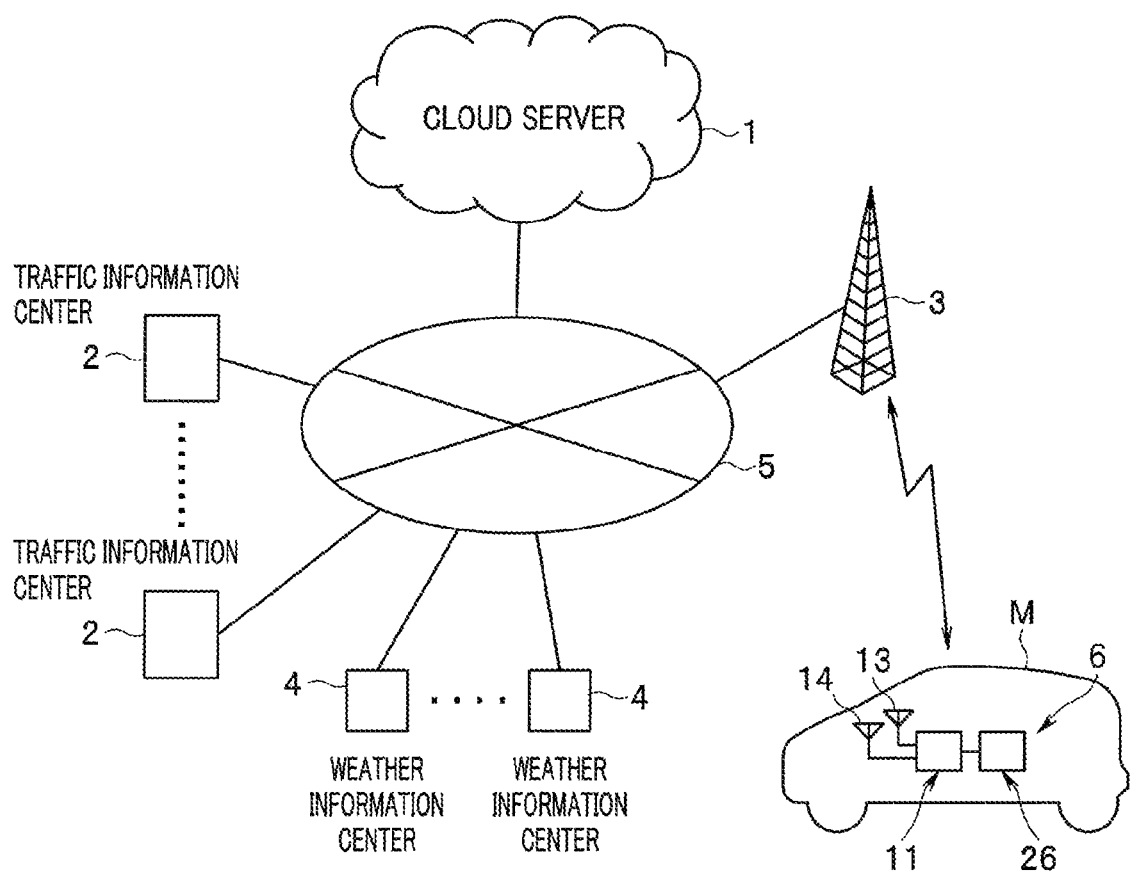
FIG. 1 is a schematic configuration diagram illustrating an entirety of an automatic driving assist system.

In a traveling on a travelable road surface that is snow-covered after snow removal (hereinafter, referred to as "snow-covered road surface"), a driver tends to cause the own vehicle to travel on a side closer to a road shoulder while paying attention to a vehicle coming from an oncoming lane when there is no median strip and preparing for the case where a vehicle traveling in the same direction passes the own vehicle, with the passing vehicle being close to the own vehicle. Furthermore, even if the road actually has three lanes, for example, when snow is piled up on the road shoulder, there is a case where vehicles travel using the three lanes as two lanes by taking a wider road width for one lane.

A target travel path set based on the high-precision road map is generally set on the center of the lane in which the own vehicle travels on a road with no snow. Therefore, in the traveling on the snow-covered road surface, there is a possibility that a course line selected by the own vehicle driven by the driver himself or herself differs from course lines selected by the peripheral vehicles, and the own vehicle might impede the traveling of other vehicles.

In view of the above-described possibility, as disclosed in Japanese Unexamined Patent Application Publication (JP-A) No. 2018-41194, for example, it can be considered that a traveling locus of a center in a vehicle width direction of a preceding vehicle is obtained, a target travel path of an own vehicle is generated based on the traveling locus, and the own vehicle is caused to travel along the target travel path.

However, if the target travel path of the own vehicle is set based on the traveling locus of the preceding vehicle, the own vehicle is caused to travel in accordance with the course line preferred by the driver driving the preceding vehicle in the actual traveling. If the preceding vehicle travels in a manner different from that of the peripheral vehicles, the own vehicle ends up impeding the traveling of the peripheral vehicles.

It is desirable to provide a vehicle traveling control apparatus capable of continuing traveling control with excellent traveling stability without impeding traveling of other vehicles even in a situation where lane markers marking a left and a right of a lane in which an own vehicle travels cannot be recognized.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

An automatic driving assist system illustrated in FIG. 1 includes a cloud server 1 as an external information aggregation apparatus, traffic information centers 2, a base station 3, and weather information centers 4, which are connected through the Internet 5. Furthermore, also a traveling control apparatus 6 mounted on an own vehicle M is included in the automatic driving assist system. The traveling control apparatus 6 acquires cloud information from the cloud server 1 through the base station 3.

Each of the traffic information centers 2 is under the jurisdiction of a private or public institution, acquires constantly-changing traffic information (for example, the number of vehicles traveling in each of sections obtained by dividing the whole country into predetermined sections) and environment information from probe information transmitted from a probe vehicle (not illustrated) to aggregate the acquired information, and distributes the aggregated information to the cloud server 1, as traffic information. The probe information includes a vehicle ID, vehicle information (vehicle type, vehicle width, and the like), and transmission history of the probe vehicle, and a traveling route toward which the probe vehicle is to advance, etc. The transmission history includes transmission date and time (year, month, date, and time), a position (latitude, longitude) at the time of transmission, a vehicle speed, a direction in which the probe vehicle travels, and the like.

Furthermore, each of the traffic information centers 2 under the jurisdiction of the public institutions, for example, aggregates snow removal information (snow removal section, snow removal time, and the like) of each region at the time of snowfall and distributes the aggregated information to the cloud server 1. On the other hand, each of the weather information centers 4 is under the jurisdiction of a private or public institution, and sequentially aggregates weather information and current snowfall amounts [cm/h] in each region and distributes the aggregated weather information and snowfall amounts to the cloud server 1.

The cloud server 1 aggregates, in real time, the traffic information, snow removal information, weather information, and road surface information (dry road surface, snow-covered road surface) indicating the state of the road surface in each of the sections from a predetermined time until a present time, based on the traffic information and the snow removal information distributed from each of the traffic information centers 2, and weather information distributed from each of the weather information centers 4. The cloud server 1 causes a global dynamic map provided in the cloud server 1 to store the above-described information, as cloud information, for each of the regions (sections) sectionalized in advance, and sequentially updates the stored information.

The global dynamic map as described above has a structure of four layers in which additional map information required for supporting automatic traveling is superposed on the lower-most static information layer as a base. The static information layer is high-precision three-dimensional map information and is the lower-most base information layer in which static information with smallest change is stored. The static information includes road information (road curvature, etc.) indicating road shapes, lane information (number of lanes, lane width, etc.), three-dimensional structures (guardrail, road shoulder wall, etc.), permanent restriction information and the like, in the respective sections.

The additional map information superposed on the static information layer is classified into three layers, that is, a quasi-static information layer, a quasi-dynamic information layer, and a dynamic information layer in this order from the lower layer. The respective layers are classified according to the degree of change (variation) along a time axis. The cloud information including the above-described traffic information, weather information (snowfall information, for example), snow removal information, and road surface information (dry road surface, snow-covered road surface) is stored in the dynamic information layer, since the cloud information has a largest change and is required to be updated in real time. Note that the global dynamic map is a road map required when a vehicle, which is capable of traveling by automatic driving, is caused to travel autonomously.

The cloud server 1 distributes the information required for automatic driving to vehicles capable of traveling by automatic driving, through the base station 3. Note that, in the present embodiment, description will be made by exemplifying the vehicle (own vehicle) M in which a driver (driver at the time of manual driving) himself or herself rides, as a vehicle capable of traveling by automatic driving.

The own vehicle M includes the traveling control apparatus 6 for causing the own vehicle to travel autonomously without the driver's operation in the automatic driving section (expressway, for example). The traveling control apparatus 6 includes a locator unit 11 and an automatic driving control unit 26. The locator unit 11 is coupled with a road information transceiver 13 and a Global Navigation Satellite System (GNSS) receiver 14. The locator unit 11 estimates an own vehicle position (latitude, longitude) based on the positioning signals from a plurality of positioning satellites, which are received by the GNSS receiver 14.

In addition, the locator unit 11 accesses the cloud server 1 from the road information transceiver 13 through the base station 3 and the Internet 5, to acquire various kinds of information required for automatic driving and the map information stored in the global dynamic map. Then, the locator unit 11 map-matches the own vehicle position on the map based on the map information received by the road information transceiver 13, to construct a traveling route connecting the input destination and the own vehicle position. Furthermore, the locator unit 11 sets, on the constructed traveling route, a target travel path for executing the automatic driving, up to several kilometers ahead of the own vehicle M.

Figure 2:
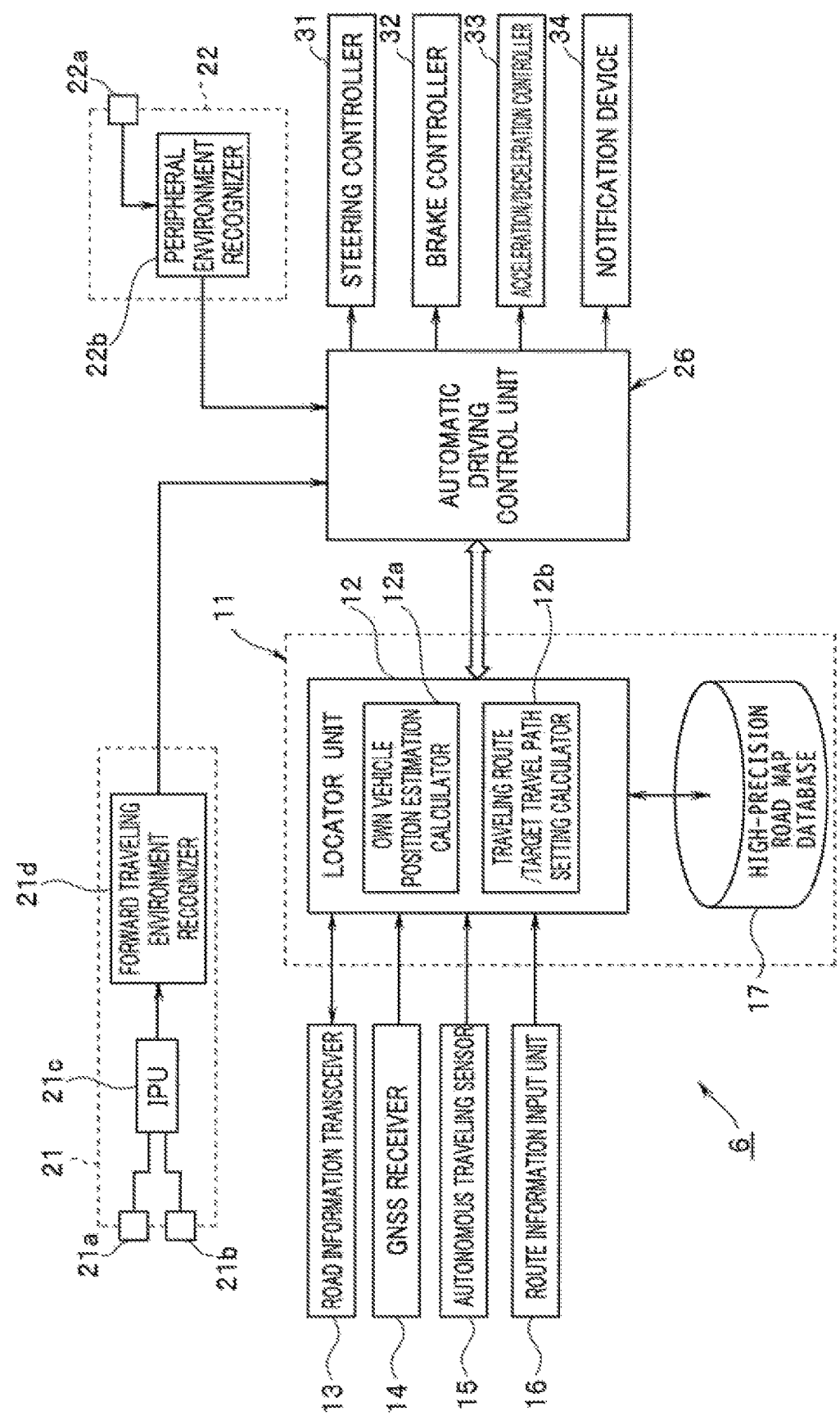
FIG. 2 is a function block diagram illustrating a driving assist unit mounted on a vehicle.

As illustrated in FIG. 2, the locator unit 11 of the traveling control apparatus 6 mounted on the own vehicle M includes a map locator calculator 12 and a high-precision road map database 17 as a map information storage unit. The map locator calculator 12, a forward traveling environment recognizer 21d, a peripheral environment recognizer 22b, and the automatic driving control unit 26, which will be described later, are configured by a well-known microcomputer including a CPU, a RAM, a ROM, a non-volatile storage unit and the like and peripheral equipment thereof, and fixed data such as a program executed by the CPU, a data table and the like are stored in the ROM in advance.

In addition to the above-described road information transceiver 13 and the GNSS receiver 14, an autonomous traveling sensor 15 and a route information input unit 16 are coupled to an input side of the map locator calculator 12. The autonomous traveling sensor 15 enables autonomous traveling in an environment such as traveling in a tunnel in which a reception sensitivity from the GNSS satellite is low, and the positioning signals cannot be effectively received. The autonomous traveling sensor 15 includes a vehicle speed sensor, a yaw rate sensor, a longitudinal acceleration sensor, and the like.

The route information input unit 16 is a terminal device operated by an occupant (mainly a driver), and can receive an input of a series of information such as a destination, a transit point, and the like required in setting of a traveling route by the map locator calculator 12. For example, the route information input unit 16 is an input unit (a touch panel on a monitor, for example) of a car navigation system, a mobile terminal such as a smart phone, a personal computer, or the like, and is coupled to the map locator calculator 12 wiredly or wirelessly.

When the occupant operates the route information input unit 16 and inputs information of the destination and the transit point (a facility name, an address, a telephone number, or the like), the input information is read by the map locator calculator 12. When the destination and the transit point are input, the map locator calculator 12 sets the position coordinates (latitude, longitude) of the destination and the transit point.

The map locator calculator 12 includes an own vehicle position estimation calculator 12a as an own vehicle position estimator configured to estimate information of an own vehicle position and a traveling route/target travel path setting calculator 12b configured to set a traveling route from the own vehicle position to the destination (and the transit point) and a target travel path along which the own vehicle M is caused to travel automatically in the automatic driving section (an expressway, for example).

In addition, the high-precision road map database 17 is a large-capacity storage medium such as an HDD in which well-known high-precision road map information (local dynamic map) is stored. The high-precision road map information has the same layer structure as that of the global dynamic map provided in the above-described cloud server 1, and has the static information in the lowermost layer as the base, the static information being in common with that in the global dynamic map. Furthermore, additional map information required for supporting automatic traveling is superposed on the lowermost static information layer. The additional map information is sequentially updated, when the traveling route is set, by acquiring, from the global dynamic map, peripheral information required for causing the own vehicle M to travel autonomously along the traveling route.

The own vehicle position estimation calculator 12a acquires current position coordinates (latitude, longitude) of the own vehicle M, based on the positioning signal received by the GNSS receiver 14, map-matches the position coordinates on the high-precision road map information, and estimates the own vehicle position (current position) on the road map. Furthermore, in an environment where the effective positioning signal from the positioning satellite cannot be received due to a lowered sensitivity of the GNSS receiver 14 as in traveling in a tunnel, the own vehicle position estimation calculator 12a switches to an autonomous navigation and executes localization by obtaining a moving distance and an azimuth based on the information (the vehicle speed detected by the vehicle speed sensor, the yaw rate (yaw angular velocity) detected by the yaw rate sensor, and the longitudinal acceleration detected by the longitudinal acceleration sensor, etc.) from the autonomous traveling sensor 15.

The traveling route/target travel path setting calculator 12b refers to the high-precision road map information stored in the high-precision road map database 17, based on the position information (latitude, longitude) of the own vehicle position estimated by the own vehicle position estimation calculator 12a and the position information (latitude, longitude) of the input destination (and the transit point). The traveling route/target travel path setting calculator 12b constructs, on the high-precision road map information, the traveling route connecting the own vehicle position and the destination (when the transit point is set, the destination via the transit point) in accordance with the route conditions (recommended route, fastest route, and the like) set in advance.

Then, a target travel path along which the own vehicle M is caused to travel by automatic driving is set up to several kilometers ahead of the own vehicle M. The items set as the target travel path include a lane in which the own vehicle M is caused to travel (for example, if there are three lanes, on which of the lanes the own vehicle M is caused to travel), lane change for passing the preceding vehicle, and a timing of starting the lane change, etc. Note that, in the present embodiment, the automatic driving section is specified to an expressway, and the target travel path is set to the traveling lane on the road shoulder side. In one embodiment, the traveling route/target travel path setting calculator 12b may serve as a "target travel path setting unit".

In addition, the traveling control apparatus 6 includes a camera unit 21 configured to recognize the traveling environment ahead of the own vehicle M and a peripheral monitoring unit 22 configured to monitor the traveling environment around the own vehicle M.

The camera unit 21 is fixed to an upper center of a front part in a cabin of the own vehicle M, and includes an in-vehicle camera (stereo camera) having a main camera 21a and a sub camera 21b disposed at symmetric positions across the center in the vehicle width direction, an image processing unit (IPU) 21c, and a forward traveling environment recognizer 21d. The camera unit 21 acquires reference image data with the main camera 21a and acquires comparison image data with the sub camera 21b.

Then, the both image data are processed into predetermined data in the IPU 21c. The forward traveling environment recognizer 21d reads the reference image data and the comparison image data that are subjected to the image processing in the IPU 21c, recognizes the same one object in both of the images based on the parallax between the images, calculates distance data (distance from the own vehicle M to the object) by using the principle of triangulation, and recognizes the forward traveling environment information which is peripheral environment information ahead of the own vehicle M. The forward traveling environment information includes the lane markers marking the left and the right of the lane in which the own vehicle M travels, preceding vehicles traveling ahead of the own vehicle M and on an adjacent lane, a border between a snow wall formed by the snow cleared and piled up on the road shoulder by snow removal and the snow-covered road surface, and the like.

On the other hand, the peripheral monitoring unit 22 includes a peripheral environment recognition sensor 22a configured by an ultrasonic sensor, a millimeter wave radar, Light Detection and Ranging (LIDAR), and a camera, or a combination of these, and a peripheral environment recognizer 22b configured to recognize peripheral environment information which is moving body information around the own vehicle M based on the signal from the peripheral environment recognition sensor 22a. The peripheral environment recognition sensor 22a detects a moving body (parallel traveling vehicles, following vehicles, following vehicles traveling on the adjacent lane, and the like) around the own vehicle M. Note that, in one embodiment of the technology, both of the units 21, 22 configure a peripheral environment information acquirer.

The forward traveling environment recognizer 21d of the camera unit 21 and the peripheral environment recognizer 22b of the peripheral monitoring unit 22 are coupled to the input side of the automatic driving control unit 26. Moreover, the automatic driving control unit 26 is coupled to the map locator calculator 12 in a bidirectional communication available state, through an in-vehicle communication line (Controller Area Network: CAN, for example).

On the other hand, to the output side of the automatic driving control unit 26, a steering controller 31 configured to control the advancing direction of the own vehicle M, a brake controller 32 configured to decelerate the own vehicle M by forced brake, an acceleration/deceleration controller 33 configured to control a vehicle speed of the own vehicle M, and a notification device 34 such as a monitor, a speaker and the like, are coupled. When the target travel path is set by the map locator calculator 12, the automatic driving control unit 26 controls the steering controller 31, the brake controller 32, and the acceleration/deceleration controller 33 in a predetermined manner, to cause the own vehicle M to travel automatically along the target travel path, based on the positioning signal indicating the own vehicle position, which has been received by the GNSS receiver 14.

Figure 7:
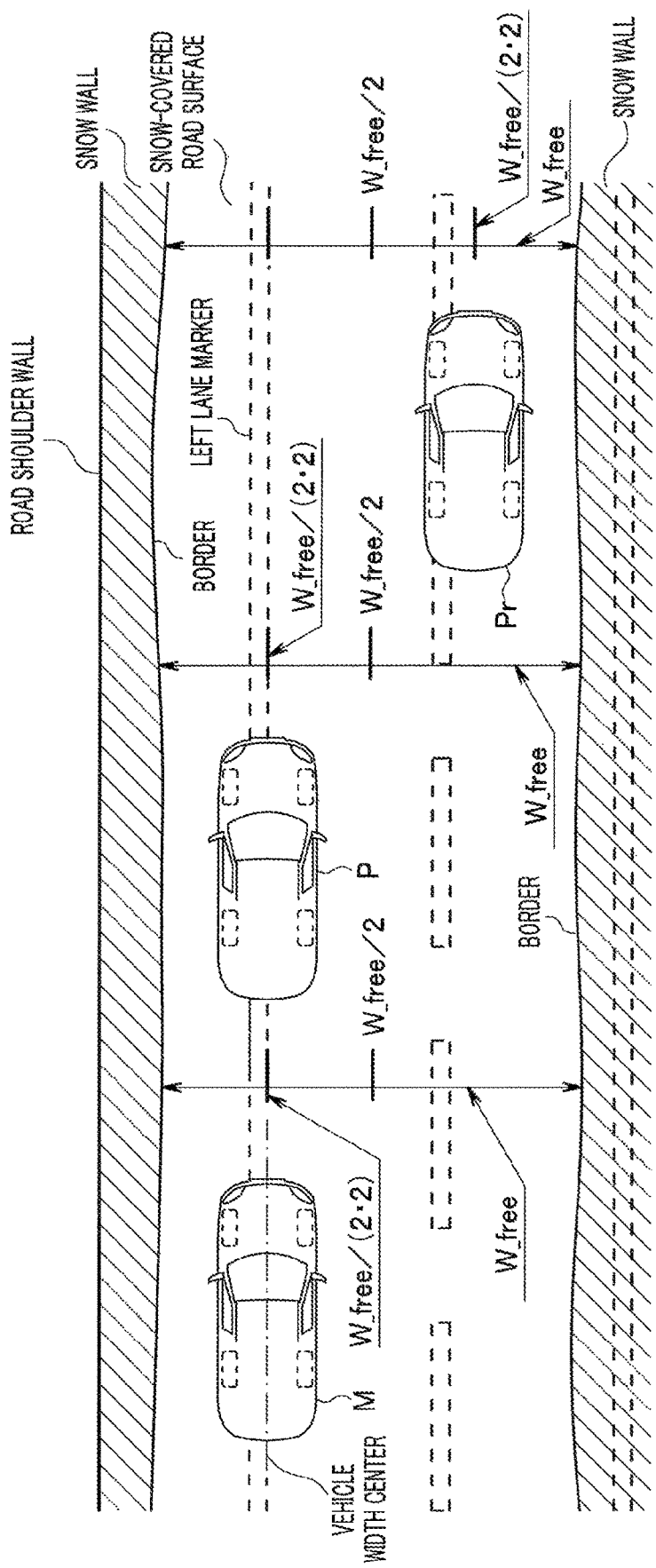
FIG. 7 is an explanatory view illustrating a traveling state at a time of traveling, under the traveling control, on a snow-covered road surface on which left and right lane markers are not recognized.
Figure 8:
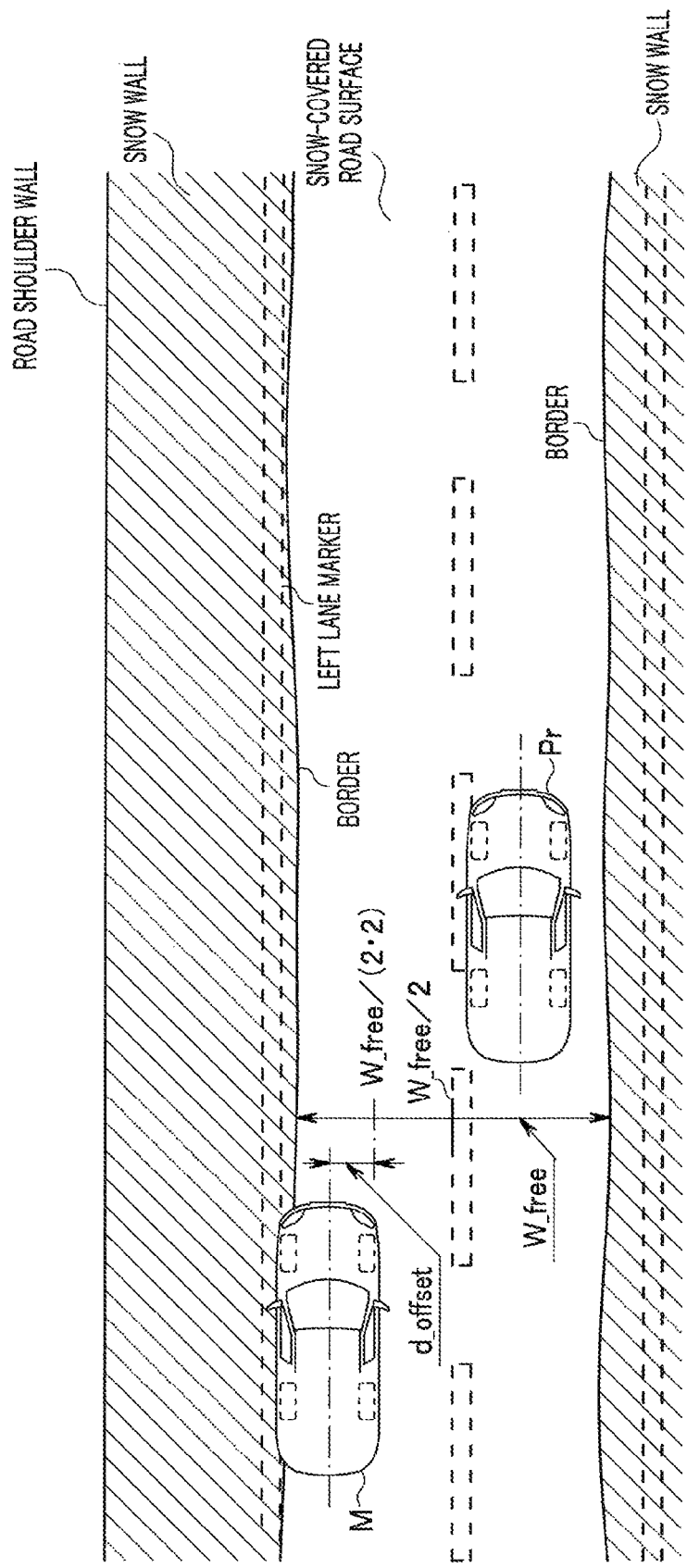
FIG. 8 is an explanatory view illustrating a traveling state with a snow wall protruding on a lane marker on a road shoulder side.
Figure 12:
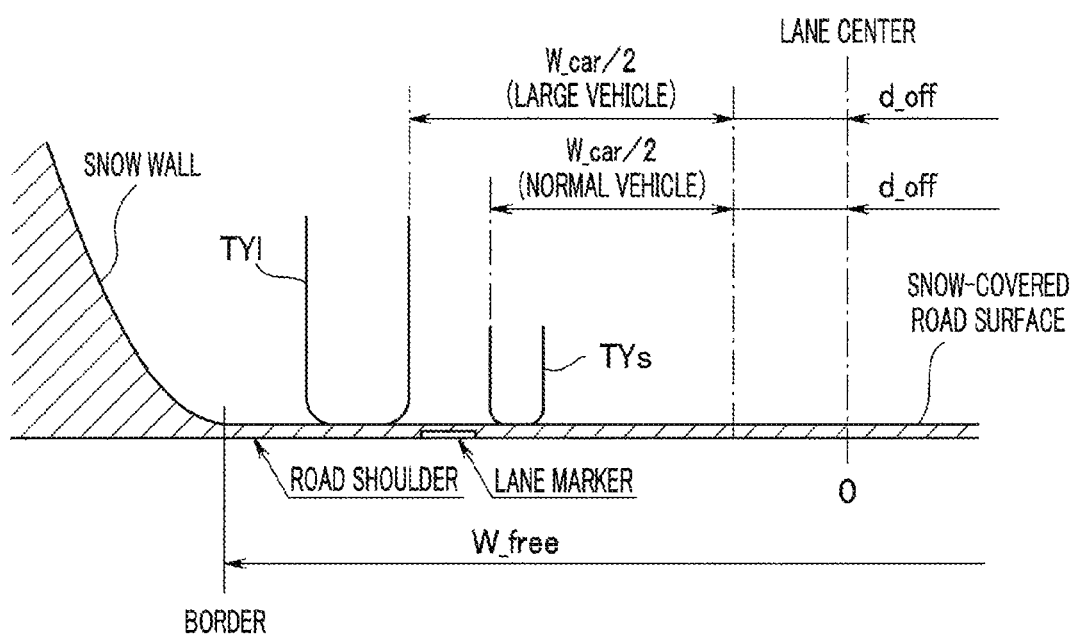
FIG. 12 is an explanatory view illustrating a deviation amount of a vehicle at a time of traveling on a snow-covered road surface.

On the snow-covered road surface as illustrated in FIGS. 7, 8, and 12, snow walls are formed by the snow, which is cleared when the snow removal is performed on the road, being piled up on the road shoulders. As a result, the snow-covered road surface (road surface formed by snow removal) between the snow walls becomes a travelable region (free space). As illustrated in FIG. 12, the both ends of the width of the snow-covered road surface (snow-covered road surface width) W_free which is a road width of the travelable region are borders between the snow-covered road surface and the snow walls, and the borders are detected from the luminance difference and the like based on the forward traveling environment information recognized by the forward traveling environment recognizer 21d of the camera unit 21.

The road width W_free of the travelable region is narrowed by the snow walls, and the driver who causes the vehicle to travel by driving the vehicle by himself or herself cannot visually recognize the lane markers, since the lane markers are snow-covered. Therefore, the driver judges which position (lateral position) the own vehicle travels using the snow walls as a guide. In such a situation, the driver tends to cause the own vehicle to travel while bringing the own vehicle near to the road shoulder side in order to ensure the traveling stability of the own vehicle and avoid contact with a vehicle that tries to pass the own vehicle.

Figure 10:
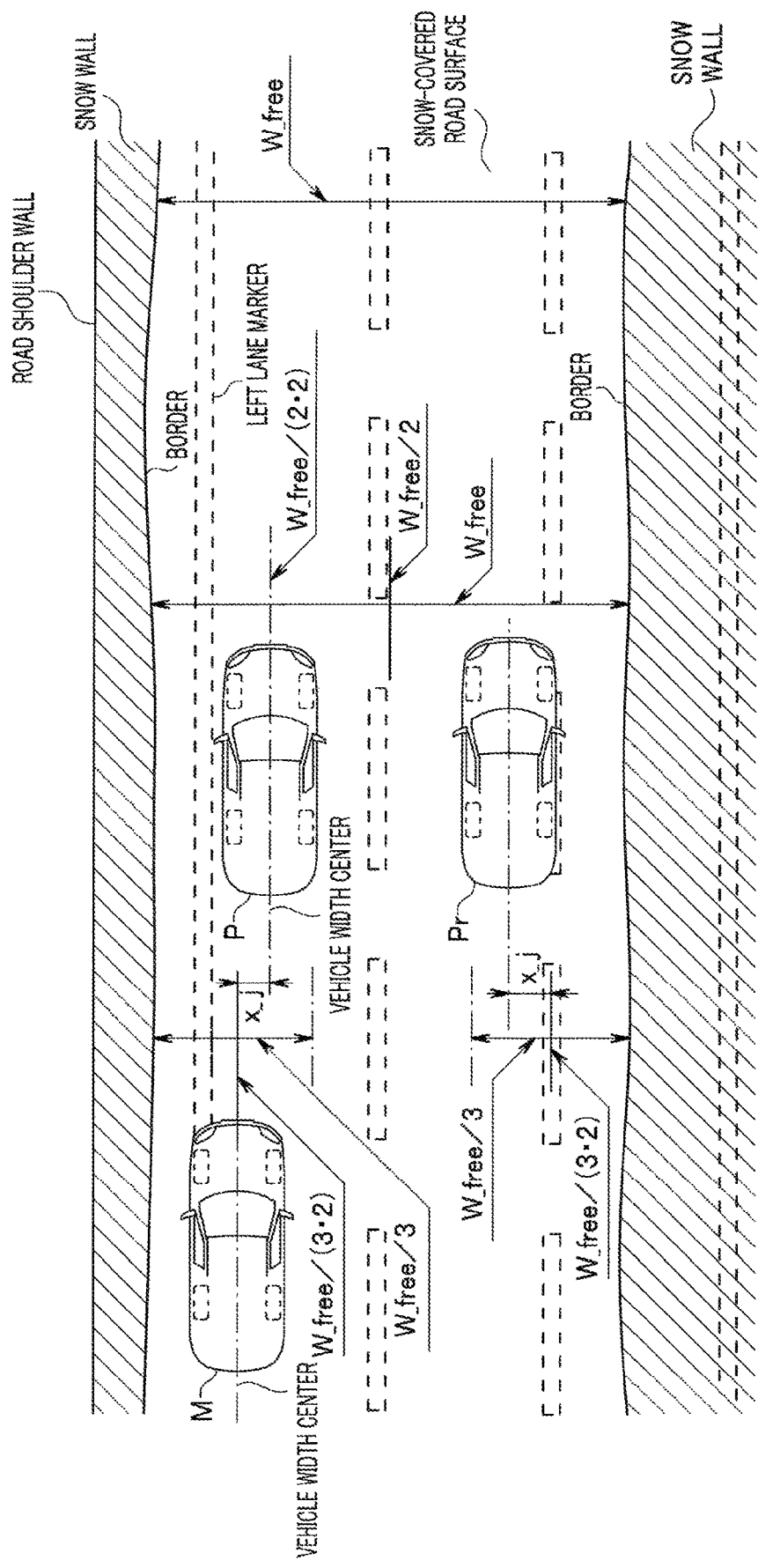
FIG. 10 is an explanatory view illustrating a state where vehicles are traveling, with three lanes on a snow-covered road surface used as two lanes.

In addition, as illustrated in FIG. 10, for example, there is a case where the road width W_free of the travelable region becomes the width for 2.5 lanes due to the snow walls protruding toward the traveling lanes, even if the road actually has three lanes. In such a case, the driver who drives the vehicle traveling on the snow-covered road surface by himself or herself cannot visually recognize the lane markers. Therefore, the driver tends to cause the own vehicle to travel by regarding the travelable region as two lanes by taking a wider width for one lane.

Since the target travel path generated on the high-precision road map does not correspond to the road width W_free narrowed by snow coverage, the target travel path does not coincide the actual traveling route on which other vehicles travel. If the own vehicle M is caused to travel along the target travel path, there is a possibility that the own vehicle M contacts the snow wall or impedes the traveling of other vehicles.

In view of the above, the automatic driving control unit 26, when the own vehicle M travels on the snow-covered road surface, confirms behaviors of other vehicles and the positions of the snow walls, corrects the target travel path set by the traveling route/target travel path setting calculator 12b of the map locator calculator 12 in a predetermined manner such that automatic driving is continued in a stable state without impeding the traveling of other vehicles, and updates the target travel path with the corrected one.

Figure 3:
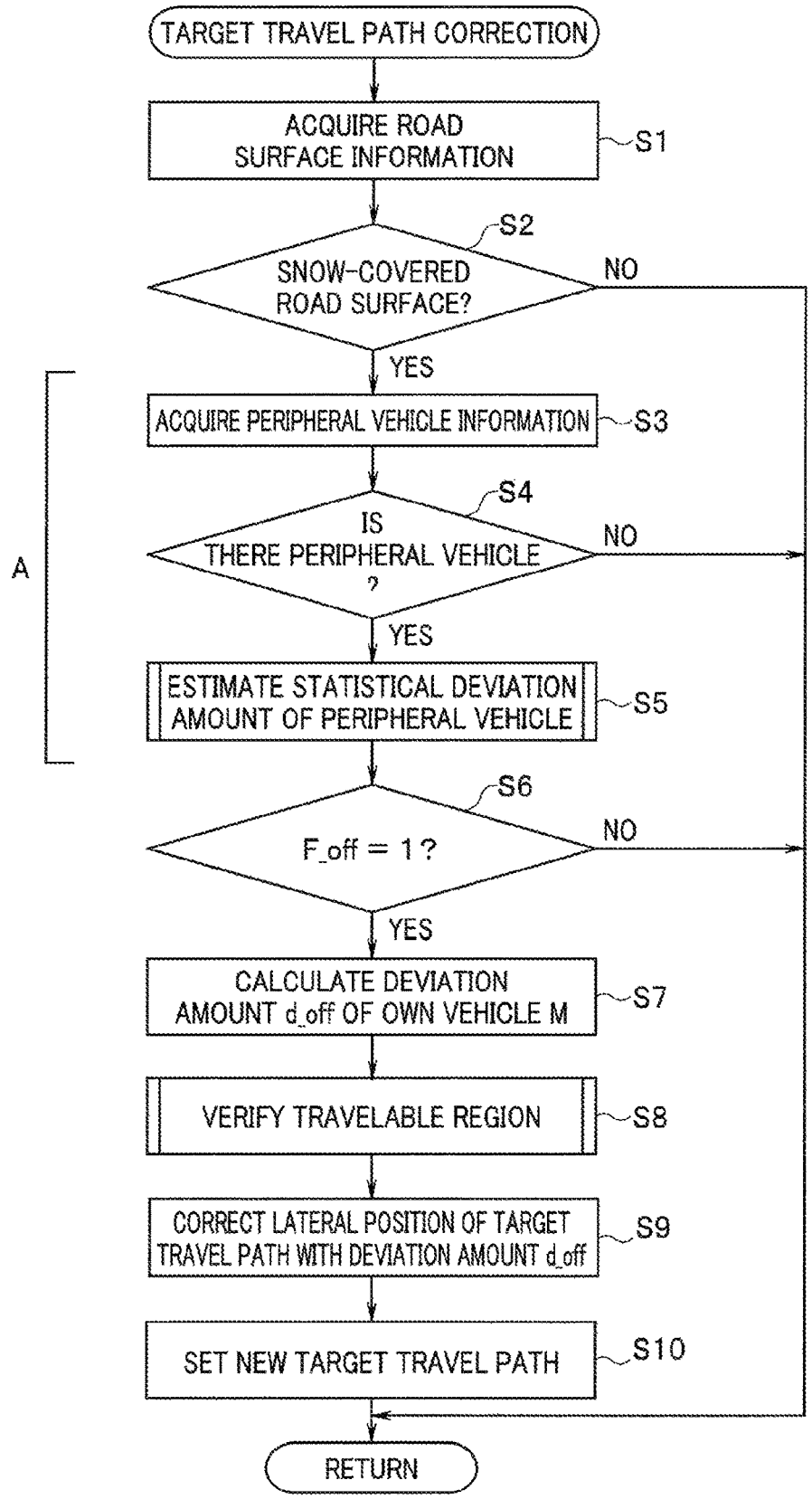
FIG. 3 is a flowchart illustrating a target travel path correction routine.

In one embodiment, the update of the target travel path, which is executed by the automatic driving control unit 26, is processed according to the target travel path correction routine illustrated in FIG. 3.

In the routine, first in step S1, road surface information indicating the road surface state is acquired. Then, the procedure proceeds to step S2 where it is checked whether the road surface is a snow-covered road surface, based on the road surface information. When the road surface is the snow-covered road surface, the procedure proceeds to step S3. When there is no snow coverage on the road surface, the procedure exits the routine.

The road surface state is determined based on the forward traveling environment information recognized by the forward traveling environment recognizer 21d of the camera unit 21, for example. Based on whether the lane markers marking the left and the right of the lane in which the own vehicle M travels are recognized and on the luminance of the road surface, when the lane markers cannot be recognized and the luminance is high, it is determined that the road surface is the snow-covered road surface. Alternatively, determination on whether the road surface is the snow-covered road surface may be made by acquiring the cloud information, which is stored in the cloud server 1, of the section toward which the own vehicle M is to advance. In one embodiment, the processing in the step S1 may correspond to a "road surface information acquirer".

Figure 6:
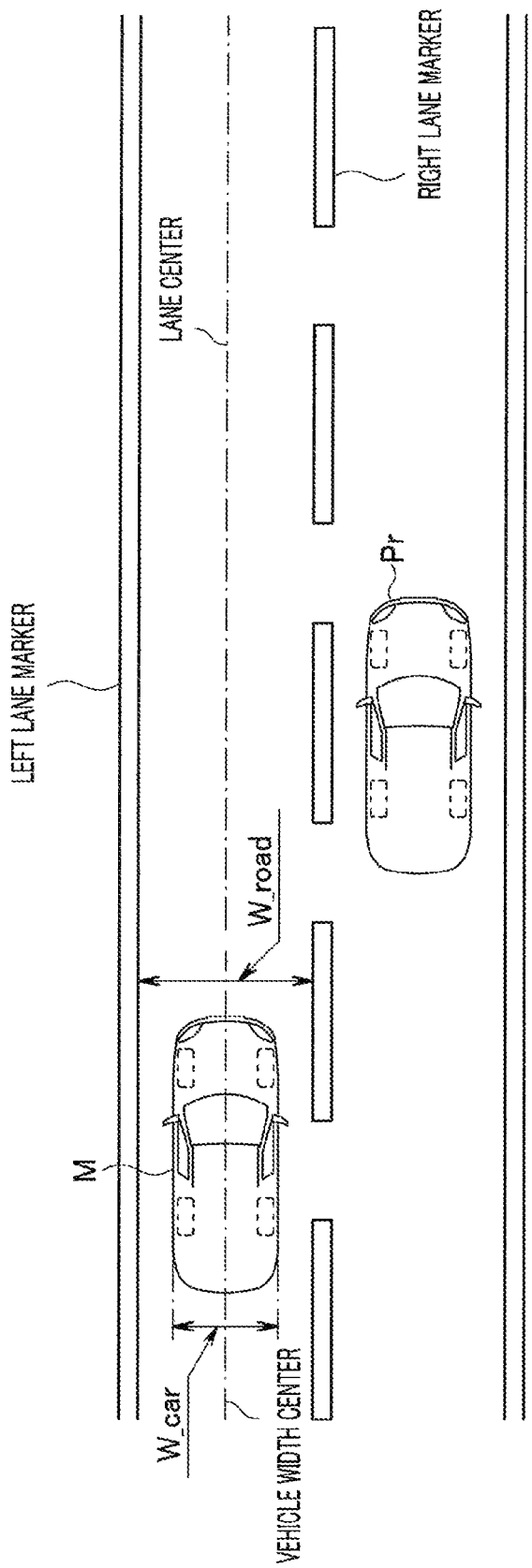
FIG. 6 is an explanatory view illustrating a traveling state at a time of traveling, under a traveling control, on a road with no snow coverage.

When the procedure exits the routine directly from the step S2, the automatic driving control unit 26 causes the own vehicle M to travel automatically along the target travel path set by the traveling route/target travel path setting calculator 12b of the map locator calculator 12. At that time, as illustrated in FIG. 6, based on the forward traveling environment information recognized by the forward traveling environment recognizer 21d of the camera unit 21, the lane markers marking the left and the right of the lane is detected and the lateral position deviation between the center of the width between the left and the right lane markers (lane width) W_road and the center of the vehicle width W_car of the own vehicle M is obtained. Then, feedback correction is performed on the target travel path set on the high-precision road map such that the lateral position deviation becomes zero.

Note that, in the present embodiment, the vehicle width W_car of a vehicle having a narrow vehicle width not wider than a vehicle width of a normal vehicle is supposed to be set on the outside of the tires (winter tires) TYs, that is, set to be a value obtained by adding a tire width to a tread. On the other hand, the vehicle width W_car of a large vehicle having a wide vehicle width is supposed to be set on the inside of the tires (winter tires) TYs, that is, set to be a value obtained by subtracting a tire width from a tread. Note that the own vehicle M is illustrated as a normal car in FIGS. 6 to 10 for convenience.

When the procedure proceeds to the step S3, the peripheral vehicle information on whether there is a vehicle traveling around the own vehicle M is acquired, with the position coordinates of the current traveling position of the own vehicle M as a reference. The peripheral vehicle information is acquired from the forward traveling environment information recognized by the forward traveling environment recognizer 21d of the camera unit 21 and the peripheral environment information recognized by the peripheral environment recognizer 22b of the peripheral monitoring unit 22. Alternatively, the peripheral vehicle information may be acquired by vehicle-to-vehicle communication between the own vehicle M and other vehicles.

Figure 9:
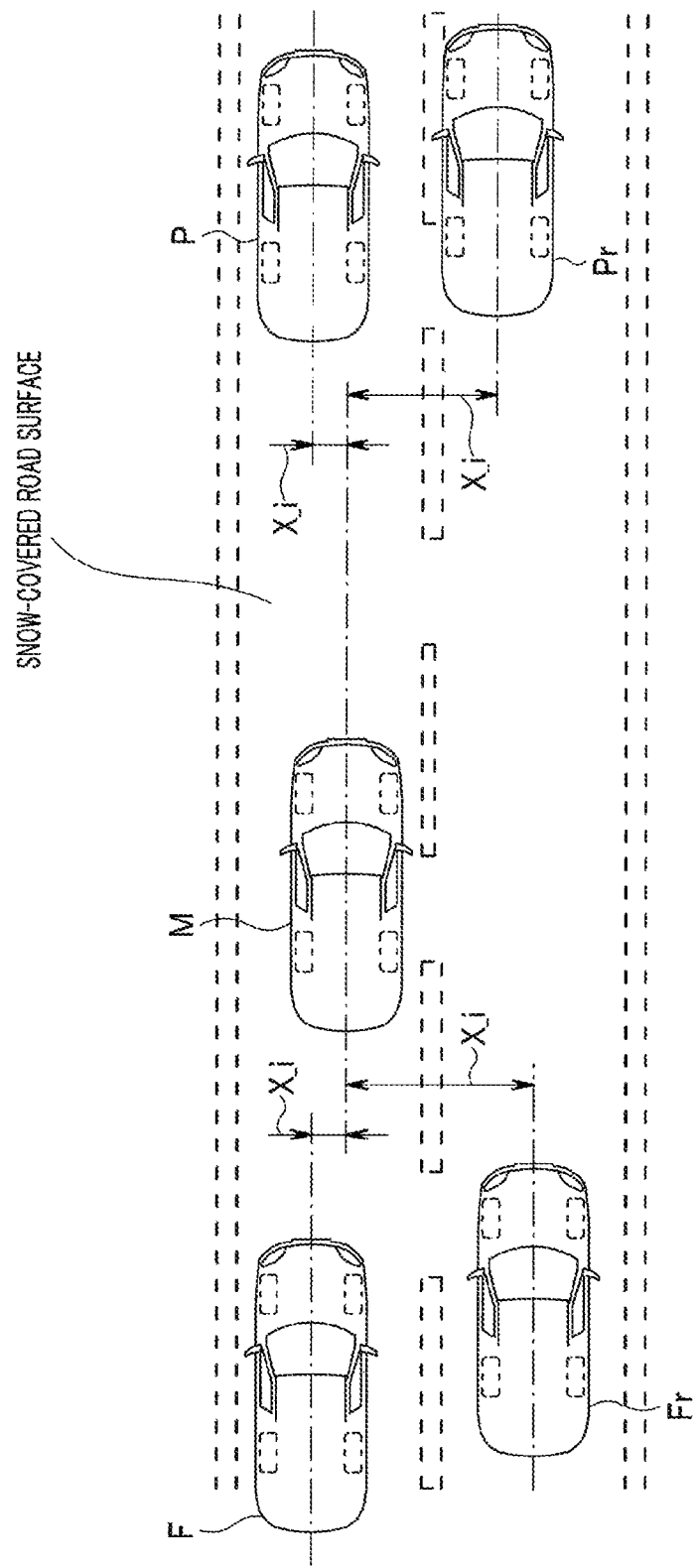
FIG. 9 is an explanatory view illustrating a state where an own vehicle is traveling on a snow-covered road surface with two lanes together with peripheral vehicles.

In this case, as illustrated in FIG. 9, the peripheral vehicles include a preceding vehicle P traveling ahead of the own vehicle M, a following vehicle F following behind the own vehicle M, an adjacent preceding vehicle Pr traveling ahead on the adjacent lane which is on the opposite side of the road shoulder, and an adjacent following vehicle Fr traveling behind the adjacent preceding vehicle Pr. Furthermore, a parallel traveling vehicle traveling side by side with the own vehicle M on the adjacent lane is also included in the peripheral vehicles, though not illustrated.

Then, the procedure proceeds to step S4 and when no peripheral vehicle is detected, that is, no vehicle is traveling around the own vehicle M, it is not necessary to cause the own vehicle M to travel, with the own vehicle deviated to the road shoulder side. Therefore, the procedure exits the routine. When a peripheral vehicle is detected, the procedure proceeds to step S5.

In the case where the procedure exits the routine directly from the step S4, since the own vehicle M is traveling on the snow-covered road surface, information of the lane markers cannot be acquired from the forward traveling environment information recognized by the forward traveling environment recognizer 21d of the camera unit. As a result, the automatic driving is performed by electric navigation based on the positioning signal from the GNSS receiver 14 and the high-precision road map. At that time, for example, even if the automatic driving control unit 26 causes the target travel path set by the traveling route/target travel path setting calculator 12b of the map locator calculator 12 to deviate to the center side of the road width W_free obtained based on the forward traveling environment information recognized by the forward traveling environment recognizer 21d, the own vehicle does not impede the traveling of other vehicles.

When the procedure proceeds to step S5, the deviation amount of the center in the vehicle width direction of each of the peripheral vehicles is detected. The deviation amount is lateral position information of each of the peripheral vehicles relative to the lane center on the high-precision road map. The detection of the deviation amount is performed according to the peripheral vehicle statistical deviation estimation subroutine illustrated in FIG. 4.

In the subroutine, first in step S11, the lane in which the own vehicle M is traveling is estimated by collating the current position (latitude, longitude) of the own vehicle M with the high-precision road map stored in the high-precision road map database 17 in the locator unit 11.

Next, the procedure proceeds to step S12 where the position coordinates (latitude, longitude) of each of the peripheral vehicles are detected, with the own vehicle M as a reference. The position coordinates of each of the peripheral vehicles are obtained by plotting the position of each of the peripheral vehicles on the high-precision road map, with the position coordinates of the own vehicle M as a reference. Then, based on the position coordinates of the own vehicle M and the position coordinates of each of the peripheral vehicles, the lateral position $x\_i$ of the center in the vehicle width direction of each of the peripheral vehicles P, F, Pr, and Fr is detected, with the center in the vehicle width direction of the own vehicle M as a reference (see FIG. 9).

Then, in step S13, the traveling lane on the high-precision road map, on which each of the peripheral vehicles is traveling is estimated, based on the lateral position $x\_i$ of each of the peripheral vehicles, with the own vehicle M as a reference. In one embodiment, the processing in the step S12 and the processing in the step S13 may correspond to a "peripheral vehicle lateral position information estimator".

After that, the procedure proceeds to step S14 where comparison is made between a deviation determination threshold d_sl and a deviation amount f_off from the center of the traveling lane of the adjacent following vehicle Fr traveling on the lane (adjacent lane) that is adjacent to the traveling lane of the own vehicle M on the high-precision road map, on the opposite side of the road shoulder. The deviation determination threshold d_sl is a threshold for determining whether the deviation operation is intended by the driver in consideration of a deviation width in the lateral direction from the lane center in a normal traveling. The deviation determination threshold is a value set in advance based on an experiment or the like, and set to the side of the adjacent lane close to the road shoulder.

When the deviation amount f_off of the adjacent following vehicle Fr exceeds the deviation determination threshold d_sl and is on the side close to the traveling lane of the own vehicle M, it is determined that the adjacent following vehicle Fr deviates to the traveling lane side of the own vehicle M, and the procedure branches to step S17. On the other hand, the deviation amount f_off is on the lane center side with respect to the deviation determination threshold d_sl, it is determined that the adjacent following vehicle Fr does not deviate, and the procedure proceeds to step S15.

When the procedure proceeds to step S15, the deviation amount of the center in the vehicle width direction of each of the vehicles P, F, Pr, . . . , relative to the center of each of the traveling lanes of the preceding vehicles P and the following vehicles F on the high-precision road map is obtained in a time-series manner, to estimate a statistical deviation amount (tendency of deviation amount) i_off in each of the traveling lanes. Obtaining the deviation amount i_off statistically enables high detection accuracy to be obtained.

Figure 11:
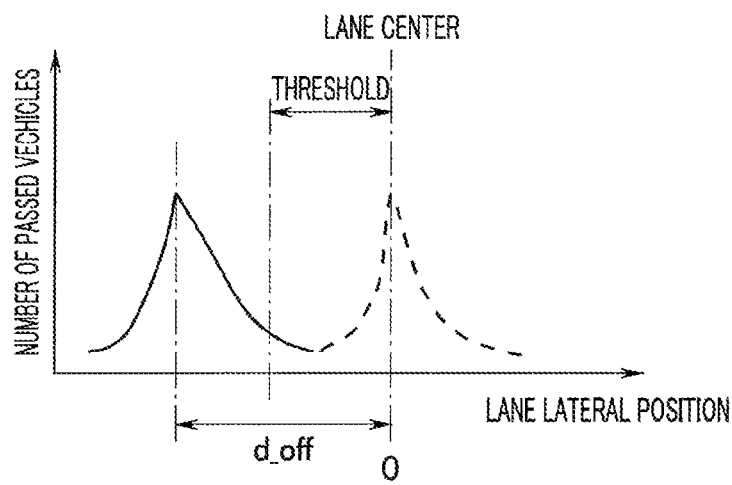
FIG. 11 is a distribution view illustrating a tendency of course line selection of traveling vehicles.

At that time, as illustrated by the dashed lines in FIG. 11, when the road surface is a dry surface, the driver causes the vehicle to travel along substantially the center of the traveling lane while recognizing the lane markers marking the left and the right of the traveling lane, and the most frequent value of the statistical deviation amounts substantially coincide with the lane center (that is, the value close to zero). On the other hand, as illustrated by the solid lines in FIG. 11, in the case of traveling on the snow-covered road surface on which the lane markers cannot be recognized, the respective vehicles tend to travel while getting close to the road shoulder, as described above. Therefore, the most frequent value of the statistical deviation amounts is deviated to the road shoulder side.

Next, the procedure proceeds to step S16 where the statistical deviation amount i_off of the preceding vehicles traveling ahead on the traveling lane of the own vehicle M and the statistical deviation amount i_off of the following vehicles traveling behind on the traveling lane of the own vehicle M are compared with a deviation determination threshold d_sl set closer to the road shoulder with respect to the lane center. When the statistical deviation amounts i_off exceed the deviation determination threshold d_sl and are close to the road shoulder side, it is determined that most of the preceding vehicles P and the following vehicles F deviate to the road shoulder side, and the procedure branches to step S17.

On the other hand, when the statistical deviation amounts i_off are on the lane center side with respect to the deviation determination threshold value d_sl, it is determined that most of the preceding vehicles P and the following vehicles F do not deviate, and the procedure proceeds to step S18. In one embodiment, the processing in the step S14 and the processing in the step S16 may correspond to a "deviation determiner".

When the procedure proceeds to the step S17, a deviation determination flag F_off is set (F_off ←1), and the procedure proceeds to the step S6 in FIG. 3. When the procedure proceeds to step S18, the deviation determination flag F_off is cleared (F_off ←0), and the procedure proceeds to the step S6 in FIG. 3.

When the own vehicle M travels on the center of the lane on the high-precision road map, for example, if the adjacent following vehicle Fr traveling on the adjacent lane which is on the opposite side of the road shoulder comes close, with the adjacent following vehicle Fr deviated to the traveling lane side of the own vehicle M, to pass the own vehicle M, the lateral position of the adjacent following vehicle Fr is very close to the lateral position of the own vehicle M, which gives a sense of unease to the driver. Therefore, in the step S14, when deviation traveling of one adjacent following vehicle Fr is detected, the procedure immediately branches to the step S17, to set the deviation determination flag F_off (F_off←1). The determination in the step S14 is performed in preference to the determination of the statistical deviation amount i_off in the step S16, which enables the traveling in accordance with the intention of the driver.

When the procedure proceeds to the step S6 in FIG. 3, the value of the deviation determination flag F_off is checked. In the case of F_off=1, the procedure proceeds to the step S7. In the case of F_off=0, the procedure exits the routine. When the procedure exits the routine directly from the step S6, the automatic driving control unit 26 causes the own vehicle to travel automatically along the target travel path set by the traveling route/target travel path setting calculator 12b of the map locator calculator 12.

When the procedure proceeds to step S7, a deviation amount d_off is calculated. The deviation amount d_off is a lateral position correction value for correcting the lateral position of the own vehicle M to the road shoulder side. As described above, when the driver causes the vehicle to travel by the driver's own driving on the snow-covered road surface on which the lane markers marking the left and the right of the lane in which the vehicle travels cannot be visually recognized, the driver tends to cause the vehicle to travel while bringing the vehicle near to the road shoulder side. In the present embodiment, the tendency of the deviation of the peripheral vehicles is checked in the above-described step S5, and when occurrence of deviation (F_off=1) is determined in the step S6, the deviation amount d_off of the own vehicle M from the lane center to the road shoulder side on the high-precision road map information is calculated independently, irrespective of the deviation amount of each of the peripheral vehicles (preceding vehicles P, following vehicles F, in particular).

In this case, as illustrated in FIG. 12, in light of the traveling stability, the vehicle width is set for each type of vehicles such that a vehicle width W_car of a vehicle having a narrow vehicle width not wider than a vehicle width of a normal vehicle is set on the outside of the tires TYs, that is, set to be a value obtained by adding a tire width to a tread, and a vehicle width W_car of a large vehicle having a wide vehicle width is set on the inside of the tires TY1, that is, set to be a value obtained by subtracting a tire width from a tread.

That is, the deviation amount d_off of the vehicle width W_car of a normal vehicle is obtained based on the expression d_off←(W_road−W_car)/2+wd.

On the other hand, the deviation amount d_off of the vehicle width W_car of a large vehicle is obtained based on the expression d_off←(W_road−W_car)/2−wd. In the above-described expressions, Wd is an allowance value set for the tires not to get on the lane markers, and set to be about 0 to 0.3 meters in the present embodiment.

When the own vehicle M is traveling on the passing lane of two lanes, or the second traveling lane or the passing lane of the three lanes, if the vehicle body protrudes to the adjacent lane, the own vehicle would obstruct the traveling of vehicles traveling on the adjacent lane. Therefore, the deviation amount d_off of the vehicle width W_car of the large vehicle is obtained based on the expression d_off←(W_road−W_car)/2−wd, supposing that the vehicle width W_car of the large vehicle is also set to a value obtained by adding the tire width to the tread similarly as the vehicle width of the normal vehicle. In this case, the allowance value wd is set to about 0.3 meters such that the tires do not get on the lane markers.

After that, the procedure proceeds to step S8 where a travelable region of the own vehicle M is verified. In one embodiment, the processing in the step S8 may correspond to a "travelable region verifier".

Figure 5:
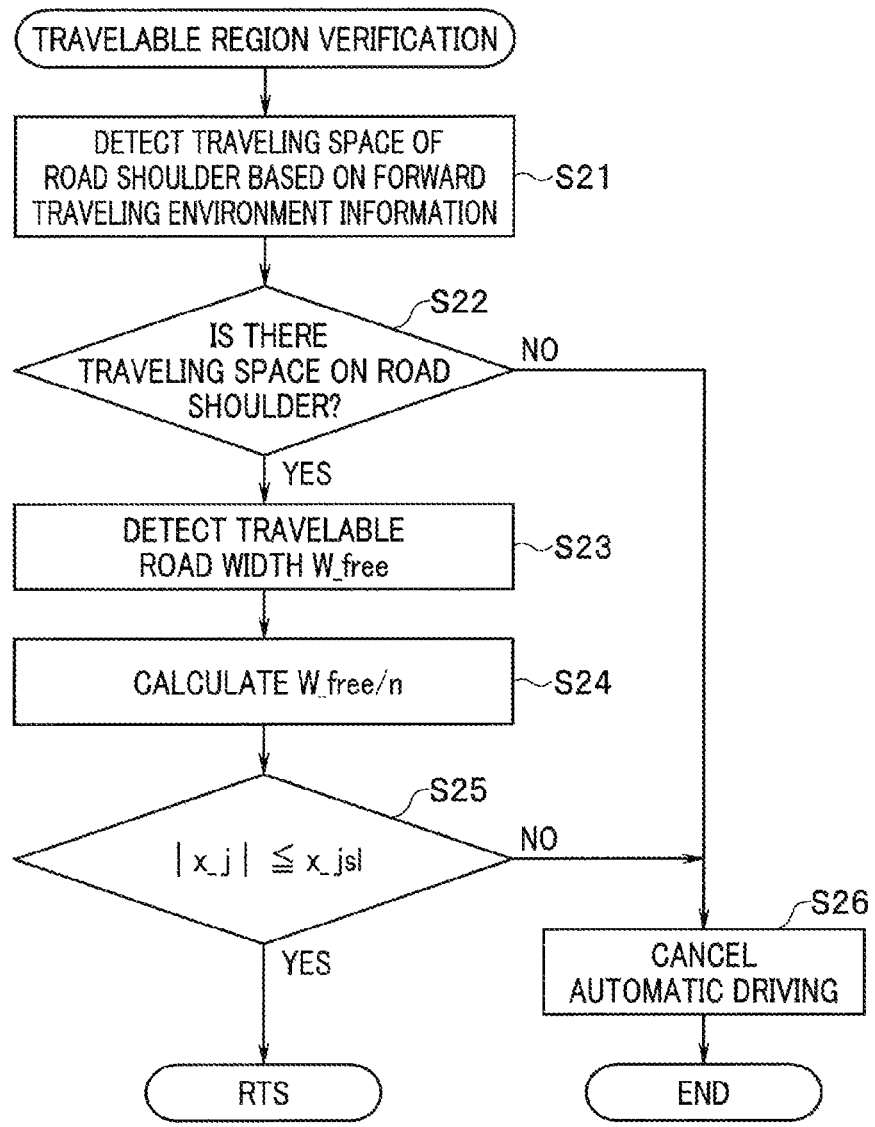
FIG. 5 is a flowchart illustrating a travelable region verification subroutine.

In the step S8, verification is performed on whether it is possible to cause the own vehicle M to travel automatically along the lane marker on the road shoulder side. The verification of the travelable region is processed according to the travelable region verification subroutine illustrated in FIG. 5.

In this subroutine, a traveling space of the road shoulder is first detected in step S21. The traveling space of the road shoulder is detected by identifying the lane marker on the road shoulder side (left lane marker in FIGS. 7 and 8) of the currently traveling lane, based on the high-precision road map and the own vehicle position, for example. Simultaneously, the border between the snow-covered road surface and the wall surface is detected based on the forward traveling environment information recognized by the forward traveling environment recognizer 21d of the camera unit 21.

Next, a distance (lateral position distance) between the identified lane marker and the detected border is obtained, to set the distance as the traveling space. The lateral position distance is obtained by subtracting the distance between the own vehicle position plotted on the high-precision road map and the detected lane marker on the road shoulder side from the lateral position distance between the own vehicle position and the border obtained with the own vehicle position as a reference, for example.

Then, in the case where the value obtained by subtracting the distance between the own vehicle position and the lane marker from the lateral position distance between the own vehicle position and the border is larger than the allowance width, it is determined that a traveling space larger than the allowance width is ensured on the road shoulder in step S22 as illustrated in FIG. 7, and the procedure proceeds to step S23.

On the other hand, in the case where the value obtained by subtracting the distance between the own vehicle position and the lane marker from the lateral position distance between the own vehicle position and the border is equal to or smaller than the allowance width, as illustrated in FIG. 8, for example, the border is in the state protruding from the lane marker on the road shoulder side (left lane marker in FIG. 8) to the road side, or the border is in the state close to the lane marker from the road shoulder side.

In such a state, it is difficult to cause the own vehicle M to travel with the tires being along the lane marker on the road shoulder side. Therefore, the procedure branches to step S26. Note that, when a three-dimensional object such as a stopped operation vehicle is recognized on the road shoulder, for example, based on the forward traveling environment information recognized by the forward traveling environment recognizer 21d of the camera unit 21, the side surface on the lane marker side of the three-dimensional object is detected as the border.

Then, the procedure proceeds to step S23 where a snow-covered road surface width W_free, which is a road width of the travelable region (free space), is detected. The snow-covered road surface width W_free is a distance between the left and right borders recognized by the forward traveling environment recognizer 21d of the camera unit 21.

Next, the procedure proceeds to step S24, the snow-covered road surface width W_free is divided by the number of lanes n of the currently traveling road, to obtain the lane width W_free/n per one lane. Then, the procedure proceeds to step S25, and it is checked whether each of the peripheral vehicles travels substantially along the center of each of the lane widths W_free (W_free/(n·2)), based on the statistical deviation amount in each of the traveling lanes, which has been obtained in the above-described step S14.

In general, when a driver tries to cause a vehicle to travel by manual driving on the snow-covered road surface on which the lane markers cannot be visually recognized, the driver recognizes the snow-covered road surface width W_free between the borders, divides the snow-covered road surface width W_free by the number of lanes, to grasp the approximate lane width W_free/n in which the vehicle is to advance. In many cases, the driver causes the vehicle to travel, with substantially the center W_free/(n·2) of the lane width W_free/n as a target.

Therefore, when the road has two lanes and the lane markers cannot be recognized because the lane markers are covered by snow as illustrated in FIG. 7, for example, the driver divides the snow-covered road surface width W_free by the number of lanes to recognize the lane width W_free/2 of the currently traveling lane, and causes the vehicle to travel, with the center (W_free/(2·2)) of the lane width W_free/2 as the target.

On the other hand, as illustrated in FIG. 10, even if the road has three lanes, there is a case where snow is removed for only about 2.5 lanes on the snow-covered road surface. In such a case, the lane width W_free/3 per one lane becomes narrow, and even if the own vehicle M tries to travel on the center W_free/(3·2)) of the lane width, the peripheral vehicles (the preceding vehicle P and the adjacent preceding vehicle Pr in FIG. 10) halve the snow-covered road surface width W_free, to secure a wide lane width per one lane, and travel on substantially the center W_free/(2·2)) of the one lane with the wide lane width.

As a result, unlike the peripheral vehicles, the own vehicle M travels on the extremely road shoulder side. However, the peripheral vehicles are traveling while securing the wide lane width per one lane, which gives a sense of incongruity to the driver (and the occupant) in the own vehicle M.

Therefore, in the step S25, a lateral position divergence amount x_j between the center W_free/(n·2) of the lane width W_free/n of the lane in which each of the peripheral vehicles (P, Pr, F, and Fr in FIG. 10) is traveling, which has been estimated in the above-described step S13, and the center in the width direction of each of the peripheral vehicles (P, Pr, F, and Fr) is obtained as an absolute value |x_j|, to compare the value |x_j| with a divergence determination value x_jsl set in advance. In the case of |x_j|≤x_jsl, it is determined that each of the peripheral vehicles is traveling in the lane width W_free/n obtained by dividing the snow-covered road surface, and the procedure proceeds to the step S9.

In the case of |x_j|>x_jsl, it is determined that each of the peripheral vehicles diverges from the lane width W_free/n obtained by dividing the snow-covered road surface, and the procedure branches to step S26. When the procedure proceeds to the step S26 from the step S22 or the step S25, the automatic driving is canceled to terminate the routine.

Then, the automatic driving control unit 26 drives the notification device 34 and notifies the driver that the automatic driving will be terminated, to require the driver to grasp the steering wheel, and after a lapse of predetermined time period, the automatic driving control unit 26 performs transition from the automatic driving to driving assist control. The driving assist control assists the driving by the driver with the well-known adaptive cruise control (ACC), a rear-side vehicle detection alarm, rear-side collision prevention assist, and the like, based on the information from the camera unit 21 and the peripheral monitoring unit 22.

When the procedure branches from the step S25 to the step S26 where the automatic driving is canceled, the driver is capable of driving the own vehicle to travel along the virtual lane in which the preceding vehicles and the following vehicles are traveling, which enables the traveling in accordance with the traveling of the peripheral vehicles. Such a traveling does not give a sense of incongruity to the driver.

On the other hand, when the procedure proceeds from the step S25 to the step S9 in FIG. 3, the lateral position of the target travel path set by the traveling route/target travel path setting calculator 12b of the map locator calculator 12 is corrected with the deviation amount d_off of the own vehicle M, which has been calculated in the step S7, and a new target travel path is set in the step S10. Then, the procedure exits the routine. In one embodiment, the processing in the step S9 and the processing in the step S10 may correspond to a "target travel path correction unit".

After driving the notification device 34 to notify the driver that traveling on the snowy road is performed, the automatic driving control unit 26 causes the own vehicle M to move to the road shoulder side by the deviation amount d_off, to perform automatic driving along the target travel path. At that time, as illustrated in FIG. 12, if the own vehicle M is a normal vehicle, the own vehicle is caused to travel with the outside of the tires being along the inside of the lane marker on the road shoulder side.

On the other hand, if the own vehicle M is a large vehicle, the own vehicle is caused to travel with the inside of the tires being along the outside of the lane marker on the road shoulder side. If the tires are rolled along on the lane marker, the gripping force of the tires decreases, which is likely to cause slipping of the tires. However, in the present embodiment, the normal vehicle is caused to travel along the inside of the lane marker and the large vehicle is caused to travel along the outside the lane marker, which prevents the gripping force of the tires from being excessively reduced.

Thus, in the present embodiment, when the own vehicle M is caused to travel on the snow-covered road surface on which the lane markers marking the left and the right of the traveling lane of the own vehicle M cannot be recognized, along the target travel path set on the lane on the road shoulder side based on the own vehicle position estimated based on the positioning signal from the GNSS receiver 14 and the high-precision road map, first the own vehicle M, the peripheral vehicles (preceding vehicle P, adjacent preceding vehicle Pr, following vehicle F, adjacent following vehicle Fr, etc.), and the lateral position x_i of each of the peripheral vehicles are detected, to identify the lanes on which the respective peripheral vehicles are traveling with reference to the high-precision road map.

Next, the statistical deviation amount, with the center of the lane in which each of the peripheral vehicles is traveling as a reference, is obtained, to check whether each of the peripheral vehicles is traveling while being deviated from the center to the road shoulder side. When it is determined that each of the peripheral vehicles is traveling while being deviated to the road shoulder side, the own vehicle M traveling on the lane on the road shoulder side is caused to travel while being deviated to the road shoulder side. As a result, the automatic driving can be continued without impeding the traveling of the peripheral vehicles.

In addition, the deviation of the own vehicle M to the road shoulder side is set irrespective of the lateral positions of the preceding vehicles and the following vehicles. When the own vehicle M is a normal vehicle, the outside of the tires is set on the inside of the lane marker on the road shoulder side, and when the own vehicle M is a large vehicle, the inside of the tires is set on the outside of the lane marker on the road shoulder side, which is capable of providing a stable traveling performance.

Furthermore, if the adjacent following vehicle Fr traveling on the adjacent lane comes close to the own vehicle M, with the adjacent following vehicle Fr deviated toward the traveling lane of the own vehicle M, the target travel path of the own vehicle M is immediately corrected to be deviated toward the lane marker on the road shoulder side. Therefore, when the own vehicle M is passed by the adjacent following vehicle Fr, the driver does not feel a sense of uneasiness.

Furthermore, when the own vehicle M is caused to travel while being deviated, verification is performed on whether a traveling space is secured on the road shoulder side by snow removal, which enables the own vehicle M to travel more safely without giving a sense of incongruity to the driver. In addition, the road width of the travelable region (free space) as the snow-covered road surface is determined by snow removal, and if the road width is narrow and vehicles are traveling by using the lanes the number of which is smaller than usual on the snow-covered road surface, the automatic driving is canceled to transition to the driving assist control. As a result, the driver is capable of driving the own vehicle along the virtual lane in which each of the preceding vehicles and the following vehicles is traveling, to thereby provide excellent traveling performance.

[Another Aspect]

Figure 13:
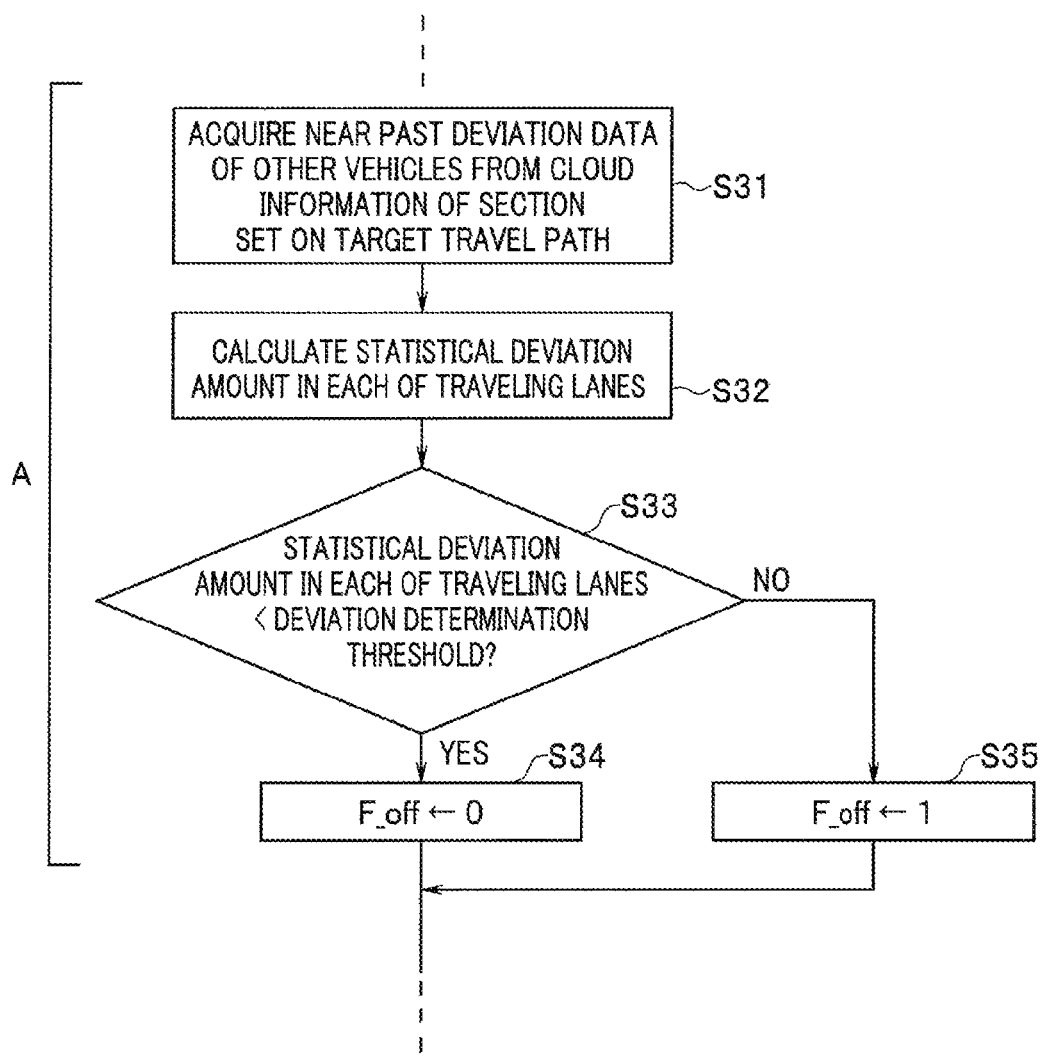
FIG. 13 is a flowchart illustrating a characteristic part of an own vehicle lateral position setting routine according to another aspect.

Instead of the deviation processing part A (steps S3 to S5) in the target travel path correction routine illustrated in the above-described FIG. 3, a deviation processing part A illustrated in FIG. 13 may be applied.

That is, in the present aspect, when it is determined that the road surface is the snow-covered road surface in the step S2 in the target travel path correction routine illustrated in FIG. 3 and the procedure proceeds to step S31, cloud information of a predetermined section set on the target travel path of the own vehicle M is acquired from the cloud server 1, and deviation data is acquired. The deviation data is lateral position information of the other vehicles that have traveled in the same section in a period from the near past (about 30 to 60 minutes ago) to present, relative to the center of the respective traveling lanes of other vehicles on the high-precision road map. The cloud server 1 acquires the deviation data for each vehicle from probe information from a probe vehicle, passage history of the traveling vehicles from road-vehicle communication, and the like, to aggregate the acquired deviation data. In one embodiment, the processing in the step S31 may correspond to an "external information acquirer".

Figure 4:
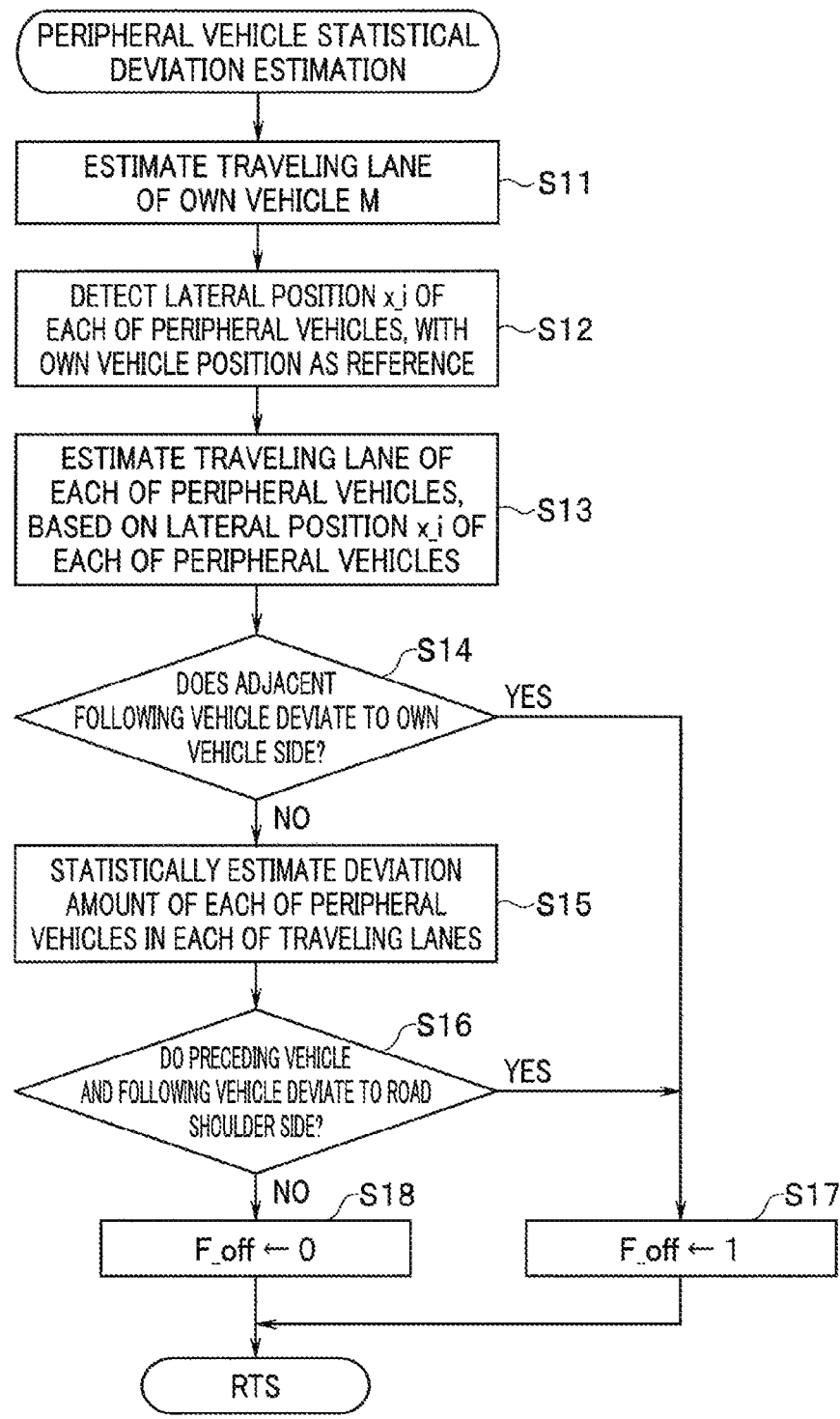
FIG. 4 is a flowchart illustrating a peripheral vehicle statistical deviation estimation subroutine.

Then, the procedure proceeds to step S32 where the aggregated deviation data of the respective other vehicles are aggregated in each of the lanes, to obtain the statistical deviation amount i_off in each of the traveling lanes in the same process as in the step S14 in the peripheral vehicle statistical deviation estimation subroutine illustrated in above-described FIG. 4.

Next, in step S33, the statistical deviation amount i_off in each of the traveling lanes is compared with the deviation determination threshold d_sl. In the case of i_off<d_sl, it is determined that no deviation occurs, and in step S34, the deviation determination flag F_off is cleared (F_off←0), and the procedure proceeds to the step S8. On the other hand, in the case of i_off≥d_sl, it is determined that deviation occurs, and the procedure branches to step S35 where the deviation determination flag F_off is set (F_off←1), to proceed to the step S8. In one embodiment, the processing in the step S33 may correspond to a "deviation determiner".

According to the aspect, the statistical deviation amount is obtained based on the cloud information, which enables the traveling situation of the peripheral vehicles on the target travel path ahead of the own vehicle to be estimated easily before the own vehicle enters the automatic driving section such as an expressway. As a result, it is possible to cause the own vehicle to travel automatically by correcting and deviating the target travel path from immediately after entering the automatic driving section, which enables the own vehicle M to travel automatically without impeding the traveling of the peripheral vehicles (preceding vehicle P, adjacent preceding vehicle Pr, following vehicle F, adjacent following vehicle Fr, etc.).

[Another Aspect]

The road surface in winter (winter road surface) is constantly snow-covered in a snowfall region, and when the snow-covered road surface is formed by a snow removal, it can be estimated that the local drivers who are used to traveling on the snowy road cause the vehicles to travel while being deviated to the road shoulder side without checking the actual traveling situation.

Figure 14:
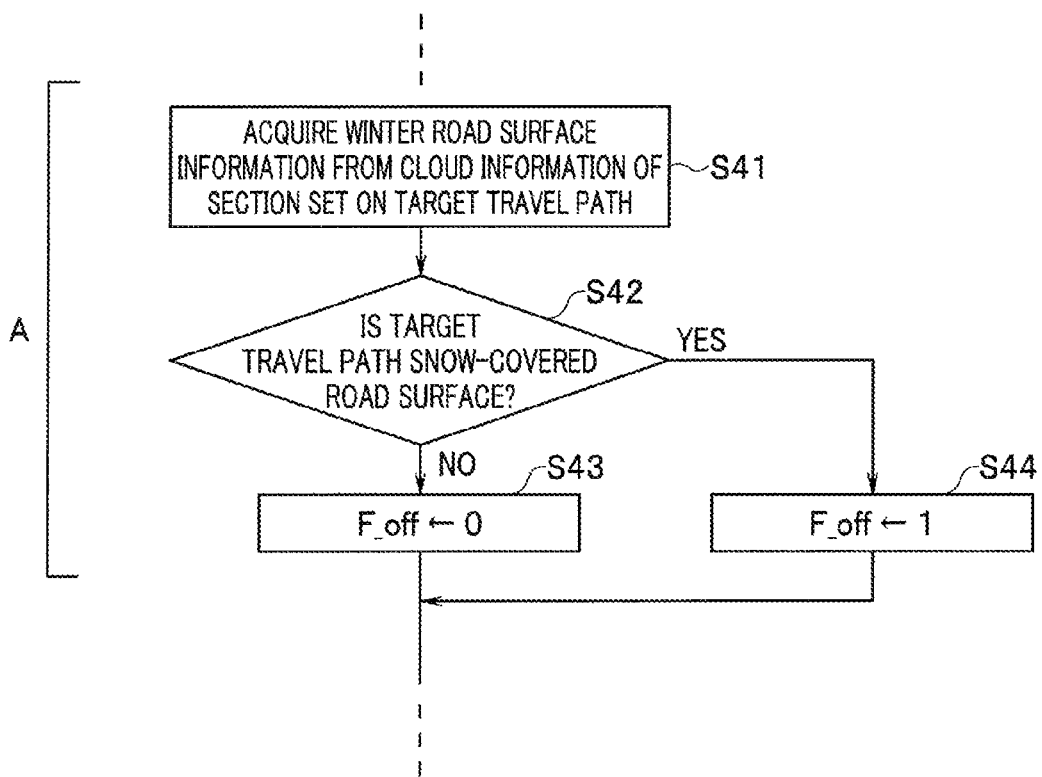
FIG. 14 is a flowchart illustrating a characteristic part of the own vehicle lateral position setting routine according to yet another aspect.

Therefore, when the own vehicle M travels in a snowfall region, it is possible to perform the deviation processing part A more simply as illustrated in FIG. 14. That is, in the present aspect, when it is determined that the road surface is the snow-covered road surface in the step S2 in the target travel path correction routine illustrated in FIG. 3, and the procedure proceeds to step S41, the cloud information of a predetermined section set on the target travel path of the own vehicle M is read from the cloud server 1, to acquire the winter road surface information from the cloud information as lateral position information of the peripheral vehicles. In one embodiment, the processing in the step S41 may correspond to the "peripheral vehicle lateral position information estimator".

Then, the procedure proceeds to step S42, to check whether the target travel path to which the own vehicle is to advance is a snow-covered road surface. When there is no snow coverage on the road surface, the procedure proceeds to step S43 where the deviation determination flag F_off is cleared (F_off←0), and the procedure proceeds to the step S8. On the other hand, when the target travel path is the snow-covered road surface, it is estimated that the respective peripheral vehicles are deviated to the road shoulder side, and the procedure branches to the step S44 where the deviation determination flag F_off is set (F_off←1), to proceed to the step S8. In one embodiment, the processing in the step S42 may correspond to the "deviation determiner".

According to the aspect, it is only checked whether the target travel path to which the own vehicle M is to advance is the snow-covered road surface, and when the target travel path is the snow-covered road surface, it is estimated that the peripheral vehicles are traveling while being deviated. Therefore, it is possible to estimate the traveling situation on the target travel path ahead of the own vehicle before entering the automatic driving section such as an expressway.

Note that the technology is not limited to the above-described embodiments, but the information of the snow-covered road surface and the traveling situations of the peripheral vehicles may be acquired through the road-vehicle communication, for example.

Each of the automatic driving control unit 26 and the map locator calculator 12 illustrated in FIG. 2 can be implemented by the aforementioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle position estimation calculator 12a and the traveling route/target travel path setting calculator 12b, and the automatic driving control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 2.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to the technology, when the own vehicle travels on the snow-covered road surface on which the lane markers marking the left and the right of the lane cannot be visually recognized, lateral position information of the peripheral vehicles traveling on the road on which the own vehicle travels, relative to the traveling lanes on the road map information is estimated, and based on the lateral position information, it is determined whether the peripheral vehicles deviate relative to the traveling lanes. When it is determined that the peripheral vehicles deviate, a deviation amount by which the own vehicle is caused to deviate to the lane marker on the road shoulder side of the traveling lane of the own vehicle on the road map information is set, the lateral position of the target travel path is corrected with the set deviation amount, and a new target travel path is set. Therefore, even in a situation where the lane markers marking the left and the right of traveling lane of the own vehicle cannot be recognized, traveling control with excellent traveling stability can be continued without impeding the traveling of other vehicles.

The invention claimed is:

1. A vehicle traveling control apparatus comprising:
a peripheral environment information acquirer configured to be mounted on an own vehicle and to acquire peripheral environment information around the own vehicle;
a map information database configured to store road map information;
one or more processors configured to execute programs stored in a memory, wherein the programs when executed cause the one or more processors to:
set a target travel path to be traveled by the own vehicle under an automatic driving mode based on i) the stored road map information and ii) input destination information, wherein the target travel path is set along a first traveling lane of a road, the road including i) a first side, ii) a second side opposite the first side, iii) a first road shoulder on the first side, and iv) a second road shoulder on the second side, the first traveling lane being a traveling lane that is closest to the first road shoulder of the road;
determine, based on the acquired peripheral environment information, that first and second lane markers marking a left and a right of the first traveling lane in which the own vehicle travels are unrecognized;
acquire, from an external server, weather information and snow-removal information along the target travel path;
determine that a road surface of the road on which the own vehicle is traveling is covered with snow based on the unrecognized first and second lane markers and the acquired weather information;
in response to determining that the road surface of the road is covered with snow based on the unrecognized first and second lane markers and the acquired weather information, 1) estimate, based on the stored road map information, an actual position of the first lane marker located closer to the first road shoulder of the first traveling lane of the snow covered road, 2) detect, based on the acquired peripheral environment information, a first border between a first snow wall on the first side of the road and the snow covered road surface, and 3) calculate a lateral position distance between the estimated actual position of the first lane marker and the detected first border;
determine that the calculated lateral position distance between the estimated actual position of the first lane marker and the detected first border is greater than an allowance width;
in response to determining that the calculated lateral position distance between the estimated actual position of the first lane marker and the detected first border is greater than the allowance width, 1) determine, based on the acquired peripheral environment information and the acquired snow removal information, a travelable region distance between the first snow wall on the first side of the snow covered road and a second snow wall on the second side of the snow covered road, and 2) calculate a virtual lane width each of one or more virtual lanes by dividing the travelable region distance determined based on the acquired information of the road surface acquired using the peripheral environment information acquirer by a number of lanes on the road determined based on the road map information stored in the map information database, wherein a number of one or more virtual lanes matches the number of lanes on the road;
estimate, based on the peripheral environment information or peripheral vehicle information on the external server, a lateral position of a peripheral vehicle traveling on the road in a same direction as the own vehicle, the peripheral vehicle traveling on one of the first traveling lane or a second traveling lane on the road;

determine, based on the estimated lateral position of the peripheral vehicle, that a deviation amount of the peripheral vehicle from a center of the one of the first traveling lane or the second traveling lane on which the peripheral vehicle is traveling exceeds a deviation amount threshold;

determine, based on the calculated virtual lane width and the estimated lateral position of the peripheral vehicle, a lateral divergence amount of the peripheral vehicle by comparing a center of the peripheral vehicle with a center of one of the one or more virtual lanes in the lateral direction of the road;

when the peripheral vehicle is determined to be traveling within the one of the one or more virtual lanes based on determining that the lateral divergence amount is less than a lateral divergence amount threshold, correct a lateral position of the target travel path along the road and set a new target travel path using the corrected lateral position of the target travel path along the road such that the own vehicle travels along a center of a virtual lane that corresponds to the first traveling lane under the automatic driving mode; and when the peripheral vehicle is determined to be diverging from the one of the one or more virtual lanes based on determining that the lateral divergence amount is equal to greater than the lateral divergence amount threshold, cancel the automatic driving mode.

2. The vehicle traveling control apparatus according to claim 1, wherein the new target travel path allows the own vehicle traveling in the first traveling lane of the road to be closer to the first road shoulder side than when the own vehicle traveled along the target travel path.

3. The vehicle traveling control apparatus according to claim 2, wherein when determining that the calculated lateral position distance between the estimated actual position of the first lane marker and the detected first border is not greater than the allowance width, the automatic driving mode on the own vehicle is cancelled.

4. The vehicle traveling control apparatus according to claim 2, wherein when a following vehicle traveling in the second traveling lane comes close to the own vehicle in close proximity to the first traveling lane, the one or more processors immediately set a deviation amount by which the own vehicle is caused to deviate toward the first lane marker of the first traveling lane.

5. The vehicle traveling control apparatus according to claim 1, wherein when determining that the calculated lateral position distance between the estimated actual position of the first lane marker and the detected first border is not greater than the allowance width, the automatic driving mode on the own vehicle is cancelled.

6. The vehicle traveling control apparatus according to claim 1, wherein when a following vehicle traveling in the second traveling lane comes close to the own vehicle in close proximity to the first traveling lane the one or more processors immediately set a deviation amount by which the own vehicle is caused to deviate toward the first lane marker of the first traveling lane.

7. The vehicle traveling control apparatus according to claim 1, wherein the new target travel path allows the own vehicle to be closer to the first road shoulder side than when the own vehicle traveled along the target travel path, and disallows tires on the first road shoulder side of the own vehicle to get on the first lane marker.

8. The vehicle traveling control apparatus according to claim 7, wherein the new target travel path allows the tires on the first road should side of the own vehicle to be located on the first road shoulder side more than the first lane marker.

9. A vehicle traveling control apparatus comprising:

a map information database configured to store road map information; and circuitry configured to:

acquire, from a peripheral environment information acquirer mounted on an own vehicle, peripheral environment information around an own vehicle, set a target travel path to be traveled by the own vehicle under an automatic driving mode based on i) the stored road map information and ii) input destination information, wherein the target travel path is set along a first traveling lane of a road, the road including i) a first side, ii) a second side opposite the first side, iii) a first road shoulder on the first side, and iv) a second road shoulder on the second side, the first traveling lane being a traveling lane that is closest to the first road shoulder of the road;

determine, based on the acquired peripheral environment information, that first and second lane markers marking a left and a right of the first traveling lane in which the own vehicle travels are unrecognized;

acquire, from an external server, weather information and snow-removal information along the target travel path;

determine that a road surface of the road on which the own vehicle is traveling is covered with snow based on the unrecognized first and second lane markers and the acquired weather information;

in response to determining that the road surface of the road is covered with snow based on the unrecognized first and second lane markers and the acquired weather information, 1) estimate, based on the stored road map information, an actual position of the first lane marker located closer to the first road shoulder of the first traveling lane of the snow covered road, 2) detect, based on the acquired peripheral environment information, a first border between a first snow wall on the first side of the road and the snow covered road surface, and 3) calculate a lateral position distance between the estimated actual position of the first lane marker and the detected first border;

determine that the calculated lateral position distance between the estimated actual position of the first lane marker and the detected first border is greater than an allowance width;

in response to determining that the calculated lateral position distance between the estimated actual position of the first lane marker and the detected first border is greater than the allowance width, 1) determine, based on the acquired peripheral environment information and the acquired snow removal information, a travelable region distance between the first snow wall on the first side of the snow covered road and a second snow wall on the second side of the snow covered road, and 2) calculate a virtual lane width each of one or more virtual lanes by dividing the travelable region distance determined based on the acquired information of the road surface acquired using the peripheral environment information acquirer by a number of lanes on the road determined based on the road map information stored in the map information database, wherein a number of one or more virtual lanes matches the number of lanes on the road;

estimate, based on the peripheral environment information or peripheral vehicle information on the external server, a lateral position of a peripheral vehicle traveling on the road in a same direction as the own vehicle, the peripheral vehicle traveling on one of the first traveling lane or a second traveling lane on the road;

determine, based on the estimated lateral position of the peripheral vehicle, that a deviation amount of the peripheral vehicle from a center of the one of the first traveling lane or the second traveling lane on which the peripheral vehicle is traveling exceeds a deviation amount threshold;

determine, based on the calculated virtual lane width and the estimated lateral position of the peripheral vehicle, a lateral divergence amount of the peripheral vehicle by comparing a center of the peripheral vehicle with a center of one of the one or more virtual lanes in the lateral direction of the road;

when the peripheral vehicle is determined to be traveling within the one of the one or more virtual lanes based on determining that the lateral divergence amount is less than a lateral divergence amount threshold, correct a lateral position of the target travel path along the road and set a new target travel path using the corrected lateral position of the target travel path along the road such that the own vehicle travels along a center of a virtual lane that corresponds to the first traveling lane under the automatic driving mode; and when the peripheral vehicle is determined to be diverging from the one of the one or more virtual lanes based on determining that the lateral divergence amount is equal to greater than the lateral divergence amount threshold, cancel the automatic driving mode.

\* \* \* \* \*